US012033786B2

(12) United States Patent
Lee et al.

(10) Patent No.: US 12,033,786 B2
(45) Date of Patent: Jul. 9, 2024

(54) MAGNETIC SHEET AND COIL COMPONENT USING THE SAME

(71) Applicant: SAMSUNG ELECTRO-MECHANICS CO., LTD., Suwon-si (KR)

(72) Inventors: Young Il Lee, Suwon-si (KR); Myoung Ki Shin, Suwon-si (KR); Ji Hoon Hwang, Suwon-si (KR); Jeong Gu Yeo, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 575 days.

(21) Appl. No.: 17/176,713

(22) Filed: Feb. 16, 2021

(65) Prior Publication Data

US 2022/0157513 A1 May 19, 2022

(30) Foreign Application Priority Data

Nov. 17, 2020 (KR) ........................ 10-2020-0153255

(51) Int. Cl.

| | |
|---|---|
| ***H01F 27/28*** | (2006.01) |
| ***H01F 17/00*** | (2006.01) |
| ***H01F 17/04*** | (2006.01) |
| ***H01F 27/255*** | (2006.01) |
| ***H01F 27/29*** | (2006.01) |

(52) U.S. Cl.

CPC ..... *H01F 27/2847* (2013.01); *H01F 17/0013* (2013.01); *H01F 17/04* (2013.01); *H01F 27/255* (2013.01); *H01F 27/292* (2013.01); *H01F 2017/048* (2013.01); *Y10T 428/32* (2015.01)

(58) Field of Classification Search

None

See application file for complete search history.

(56) References Cited

U.S. PATENT DOCUMENTS

| | | | | |
|---|---|---|---|---|
| 5,063,011 A * | 11/1991 | Rutz | H01F 3/08 | 428/407 |
| 6,261,691 B1 * | 7/2001 | Atarashi | C03C 17/3452 | 428/403 |
| 7,622,202 B2 * | 11/2009 | Maeda | H01F 41/0246 | 428/405 |
| 10,497,505 B2 * | 12/2019 | Lee | H01F 27/2804 | |
| 11,183,320 B2 * | 11/2021 | Tonoyama | B22F 1/16 | |
| 11,657,950 B2 * | 5/2023 | Jeon | H01F 1/26 | 336/233 |
| 2002/0014280 A1 * | 2/2002 | Moro | H01F 41/0246 | 148/121 |
| 2002/0040077 A1 * | 4/2002 | Hanejko | C23C 26/00 | 427/372.2 |

(Continued)

FOREIGN PATENT DOCUMENTS

| | | |
|---|---|---|
| JP | H06-196312 A | 7/1994 |
| JP | 6545732 B2 | 7/2019 |

*Primary Examiner* — Kevin M Bernatz

(74) *Attorney, Agent, or Firm* — MORGAN, LEWIS & BOCKIUS LLP

(57) ABSTRACT

A coil component includes a resin; and a magnetic particle dispersed in the resin and comprising magnetic powder particle, an insulating layer disposed on a surface of the magnetic powder particle, and a surface-treatment layer disposed on a surface of the insulating layer.

12 Claims, 10 Drawing Sheets

(56) References Cited

U.S. PATENT DOCUMENTS

| | | | | |
|---|---|---|---|---|
| 2012/0188049 | A1* | 7/2012 | Matsuura | B22F 1/16 336/212 |
| 2014/0138569 | A1* | 5/2014 | Otsuka | H01F 1/26 252/62.51 R |
| 2015/0371745 | A1* | 12/2015 | Araki | H01F 41/00 427/127 |
| 2016/0055955 | A1* | 2/2016 | Park | H01F 27/255 336/83 |
| 2016/0322139 | A1* | 11/2016 | Ye | H01F 1/24 |
| 2018/0061550 | A1* | 3/2018 | Lee | H01F 27/29 |
| 2018/0274068 | A1* | 9/2018 | Lin | C22C 33/0264 |
| 2022/0379373 | A1* | 12/2022 | Prunchak | B22F 1/00 |

* cited by examiner

MAGNETIC SHEET AND COIL COMPONENT USING THE SAME

CROSS-REFERENCE TO RELATED APPLICATION(S)

This application claims benefit of priority to Korean Patent Application No. 10-2020-0153255 filed on Nov. 17, 2020, in the Korean Intellectual Property Office, the disclosure of which is incorporated herein by reference in its entirety.

BACKGROUND

1. Field

The present disclosure relates to a magnetic sheet and a coil component using the same.

2. Description of Related Art

A magnetic sheet is used in a coil component such as an inductor. In this case, the magnetic sheet may be used to form a body of the coil component.

Meanwhile, it is necessary to improve stress resistance of the body in order to secure reliability, such as lead heat resistance, adhesion strength, or the like, of the coil component.

SUMMARY

An aspect of the present disclosure is to provide a magnetic sheet having improved adhesion between a magnetic powder particle and a resin and a coil component using the same.

Another aspect of the present disclosure is to provide a magnetic sheet having improved stress resistance and a coil component using the same.

Another aspect of the present disclosure is to provide a magnetic sheet having improved reliability, such as lead heat resistance, adhesion strength, or the like, and a coil component using the same.

According to an aspect of the present disclosure, a magnetic sheet includes a resin; and a magnetic particle dispersed in the resin and comprising a magnetic powder particle, an insulating layer disposed on a surface of the magnetic powder particle, and a surface-treatment layer disposed on a surface of the insulating layer.

According to another aspect of the present disclosure, a coil component includes a body comprising a resin and a magnetic particle disposed in the resin; a coil unit disposed inside the body; and an external electrode disposed in the body and connected to the coil unit, wherein the magnetic particle comprises a magnetic powder particle, an insulating layer disposed on a surface of the magnetic powder particle and a surface-treatment surface disposed on a surface of the insulating layer.

BRIEF DESCRIPTION OF DRAWINGS

The above and other aspects, features and other advantages of the present disclosure will be more clearly understood from the following detailed description taken in conjunction with the accompanying drawings, in which.

DETAILED DESCRIPTION

Figure 1A:
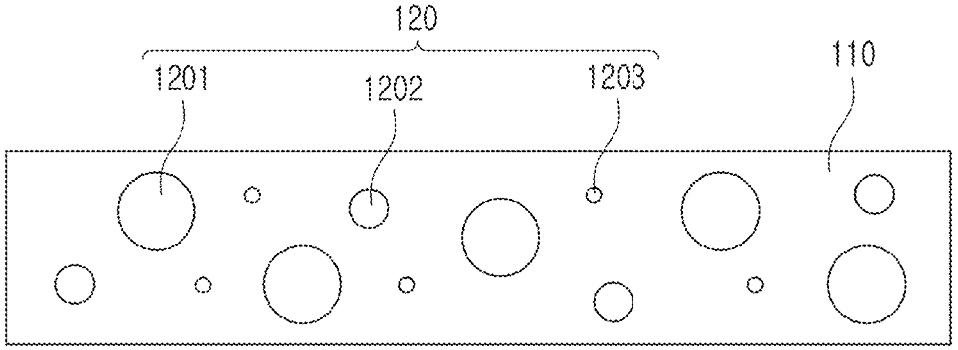
FIG. 1A is a cross-sectional diagram schematically illustrating a magnetic sheet according to an example embodiment of the present disclosure.

Hereinbelow, the present disclosure will be described with reference to the accompanying drawings. Shapes, sizes, and the like, of each component in the drawing may be exaggerated or reduced.

Magnetic Sheet

FIG. 1A is a cross-sectional diagram schematically illustrating a magnetic sheet according to an example embodiment of the present disclosure.

Figure 1B:
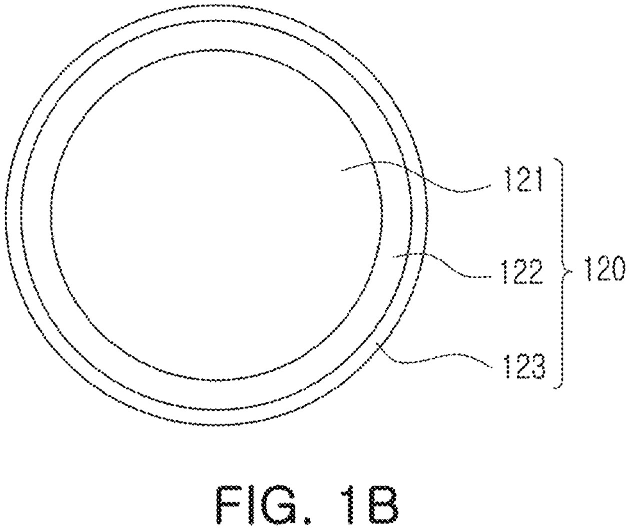
FIG. 1B is an enlarged view illustrating magnetic powder particle included in a magnetic sheet according to an example embodiment.

FIG. 1B is an enlarged view illustrating magnetic powder particle included in a magnetic sheet according to an example embodiment.

Referring to the drawings, a magnetic sheet according to an example embodiment includes a resin 110 and a magnetic particle 120 dispersed in the resin 110.

The resin 110 may serve as a binder resin mixing the magnetic particle 120 and maintaining the magnetic particle 120 as a mixed resin.

A material for forming the resin 110 is not particularly limited but may be a thermoplastic resin, a thermosetting resin, or the like. An epoxy resin, a phenol resin, or the like, may be used as the thermosetting resin, and, polyimide, a liquid crystal polymer (LCP), or the like, may be used as a thermoplastic resin.

The magnetic particle 120 includes magnetic powder particle 121, an insulating layer 122 disposed on a surface of the magnetic powder particle 121, and a surface-treatment layer 123 disposed on a surface of the insulating layer 122. As an additional configurational element may be further included between the magnetic powder particle 121 and the insulating layer 122, the insulating layer 122 has been described as being disposed on the surface of the magnetic powder particle 121. In contrast, the surface-treatment layer 123 is a configurational element adjacent to the insulating layer 122 and formed directly on the surface of the insulating layer 122 and has thus been described as being disposed on the surface of the insulating layer 122.

The magnetic powder particle 121 may be ferrite powder particle or magnetic metal powder particle. The magnetic powder particle 121 may have a spherical shape, but is not limited thereto.

The ferrite powder particle may be at least one of a spinel type ferrite, such as Mg—Zn-based, Mn—Zn-based, Mn—Mg-based, Cu—Zn-based, Mg—Mn—Sr-based, Ni—Zn-based, and the like, a hexagonal ferrite, such as Ba—Zn-based, Ba—Mg-based, Ba—Ni-based, Ba—Co-based, Ba—Ni—Co-based, and the like, a garnet-type ferrite, such as Y-based, and the like, and Li-based ferrite.

The magnetic metal powder particle may include at least one selected from the group consisting of iron (Fe), silicon (Si), boron (B), chromium (Cr), niobium (Nb), copper (Cu), phosphorus (P), cobalt (Co), nickel (Ni) and aluminum (Al). For example, the magnetic metal powder particle may be an Fe powder particle, an Fe—Si alloy powder particle, an Fe—Al alloy powder particle, an Fe—Si—Al alloy powder particle, or a powder particle obtained by mixing two or more of the powder particles.

The magnetic metal powder particle may be amorphous, crystalline or nanocrystalline. For example, the magnetic metal powder particle may be a Fe—Si—B—Cr-based amorphous alloy powder particle, but is not necessarily limited thereto.

A material having insulating properties may be used as a material for forming the insulating layer 122. For example, the insulating layer 122 may be an oxide film comprising at least one metal of iron (Fe), aluminum (Al), silicon (Si), titanium (Ti), magnesium (Mg), chromium (Cr), zinc (Zn), phosphorus (P), or boron (B). Alternatively, the insulating layer 122 may be formed through a phosphate coating, such as a zinc phosphate coating, an iron phosphate coating, a manganese phosphate coating, or the like, or organic coating such as epoxy coating.

The surface-treatment layer 123 may be formed by treating the surface of the insulating layer 122 disposed on the surface of the magnetic powder particle 121 with a surface-treatment agent.

As the surface treatment agent, it is preferable to use a material having excellent adhesion to a surface of the magnetic powder particle 121 on which the insulating layer 122 is formed, and having excellent coupling with the resin 110. For example, at least one of oleic acid or a silane coupling agent may be used for forming the surface-treatment layer 123. A urethane silane coupling agent may be used as the silane coupling agent.

Meanwhile, an epoxy resin was used as the resin 110 in the present disclosure. In terms of improving the coupling with the epoxy resin, oleic acid and a urethane-based silane coupling agent were used as the surface-treatment agent in Example 1 and Example 2, respectively.

The surface-treatment layer 123 may include a component comprising at least one functional group of an alkyl group, a carbonyl group or an urethane acrylate. The present inventors have confirmed that an alkyl group and a carbonyl group, which are coupling components derived from an oleic acid, were detected in Example 1, and urethane acrylate, a coupling component derived from a urethane-based silane coupling agent, was detected in Example 2. In this case, the functional group included in the surface-treatment layer 123 can be detected using Fourier-transform infrared (FT-IR) spectroscopy.

Meanwhile, the magnetic sheet may include at least one of oleic acid, a derivative of oleic acid, or carbonic acid monoamide N-allyl neopentyl ester. The derivative of oleic acid may include at least one of oleic acid methyl ester, butyl oleate or oleic acid 3-hydroxypropyl ester. In the case of Example 1, the present inventors confirmed that oleic acid and oleic acid derivatives such as oleic acid methyl ester, butyl oleic acid, and oleic acid 3-hydropropyl ester, which are components derived from oleic acid included in the surface treatment layer, were detected. In addition, it has been confirmed in Example 2 that carbonic acid monoamide N-allyl neopentyl ester, a component derived from an urethane-based silane coupling agent, was detected. Components included in the magnetic sheet may be detected by gas chromatography-mass spectrometry (GC-MS).

The magnetic particles 120 may include two or more magnetic particles 1201, 1202 and 1203 having different average particle sizes. For example, the magnetic particles 120 may include a first magnetic particle 1201 and a second magnetic particle 1202, having an average particle size smaller than that of the first magnetic particles 1201. In addition to the first magnetic particle 1201 and the second magnetic particle 1202, the magnetic particle 120 may further include a third magnetic particle 1203 having an average particle size smaller than that of the second magnetic particle 1202.

An average particle size of magnetic particles 120 may be determined by an average particle size of the magnetic powder particle 121. The average particle size may refer to a diameter according to a particle size distribution expressed as D50 or D90. For example, the average particle size of the magnetic powder particle 121 included in the second magnetic particle 1202 may be smaller than that included in the first magnetic particle 1202, and the average particle size of the magnetic powder particle 121 included in the third magnetic particle 1203 may be smaller than that included in the second magnetic particles 1202. Accordingly, the first magnetic particles 1201, the second magnetic particles 1201 and the third magnetic particles 1203 may have a large average particle size in said order. Thicknesses of the insulating layer 122 and the surface treatment layer 123 disposed on each of the first magnetic particles 1201, the second magnetic particles 1202 and the third magnetic particles 1203 may be the same as or different from each other.

The average particle size of the magnetic powder particle 121 included in the first magnetic particles 1201 may be about 30 μm based on D50 and about 60 μm to about 70 μm based on D90, but is not limited thereto. The average particle size of the magnetic powder particle 121 included in the second magnetic particles 1202 may be about 2 μm based on D50 and about 8 μm to about 9 μm based on D90, but is not limited thereto. The average particle size of the magnetic powder particle 121 included in the third magnetic particles 1203 may be about 150 μm to about 200 nm based on D50 and about 1 μm or less based on D90, but is not limited thereto.

A method of measurement of the particle size of the magnetic powder particle includes, but not limited to, a method using SEM. Specifically, the particle size of the magnetic powder particle were measured by analyzing an image obtained by scanning a cross section of the sample magnetic sheet at 5*k* magnification using an XHR SEM. Feret diameters of the particle on the scanned image were measured using Zootos as particle size measurement software and were used as the sizes of the particle of the magnetic powder particle.

Meanwhile, there may be a case in which interfacial degradation between the resin 110 and the magnetic particles 120 may occur on the magnetic sheet, and the adhesion between the resin 110 and the magnetic particles 120 may affect the stress of the magnetic sheet. In addition, the reliability of the magnetic sheet such as lead heat resistance and adhesion strength may be affected. The interface degradation between the resin 110 and the magnetic particles 120 occurs more frequently, particularly under a high temperature condition in which the adhesion between the resin 110 and the magnetic particles 120 decreases.

In the case of the magnetic sheet according to the present disclosure, the magnetic particles 120 include the surface treatment layer 123, through which a magnetic sheet having improved adhesion between the magnetic particles 120 and the resin 110 may be provided. This results in providing not only a magnetic sheet having improved stress but also a magnetic sheet having improved reliability such as lead heat resistance and adhesion strength.

Coil Component

Figure 2A:
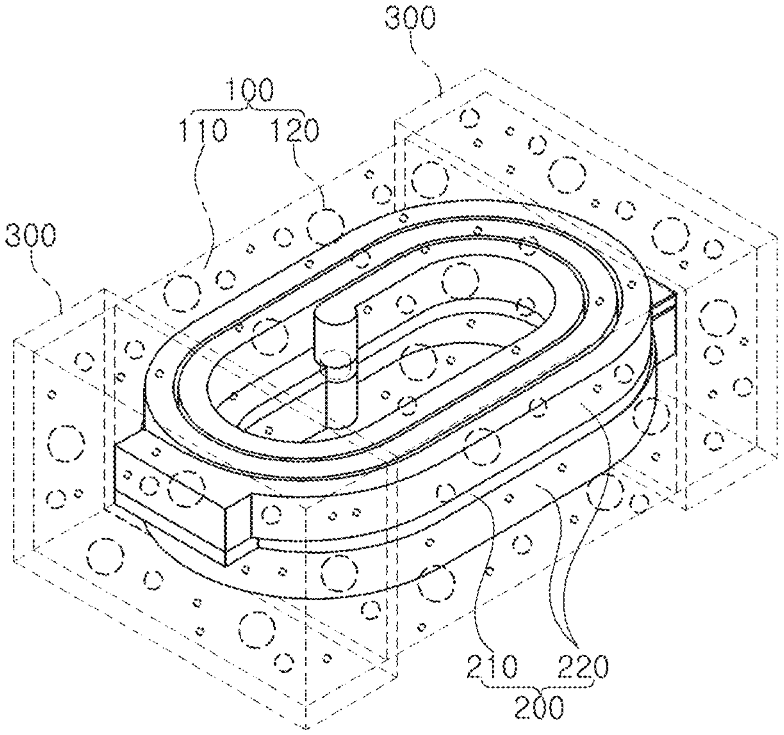
FIG. 2A is a perspective diagram schematically illustrating a coil component according to an example embodiment.

FIG. 2A is a perspective diagram schematically illustrating a coil component according to an example embodiment.

Referring to FIG. 2A, a coil component according to the present disclosure includes a body 100 including a resin 110 and magnetic particles 120 dispersed in the resin 110, a coil unit 200 disposed inside the body, and an external electrode 300 disposed in the body 100 and connected to the coil unit 200.

The body 100 may form an exterior of the coil component according to the example embodiment and may serve to bury the coil unit 200 therein. The body 100 may be formed to have a hexahedral shape as a whole, but is not limited thereto.

The body 100 may be formed by stacking one or more magnetic sheets including the resin 110 and the magnetic particles 120 dispersed in the resin 110. Accordingly, the body 100 includes the resin 110 and the magnetic particles 120 dispersed in the resin 110, which are configurational elements according to an example embodiment.

Accordingly, in the case of the coil component according to an example embodiment, the body 100 in which a plurality of magnetic sheets are stacked includes components derived from a surface treatment agent. That is, the body 100 may include at least one of oleic acid, a derivative of oleic acid, or a carbonic acid monoamide n-allyl neopentyl ester. The derivative of oleic acid may include at least one of oleic acid methyl ester, butyl oleic acid or oleic acid 3-hydropropyl ester. In the case of Example 1, the present inventors have confirmed that oleic acid and oleic acid derivatives such as oleic acid methyl ester, butyl oleic acid, and oleic acid 3-hydropropyl ester, which are components derived from oleic acid, were detected. Components included in the magnetic sheet may be detected by gas chromatography-mass spectrometry (GC-MS).

The resin 110 and the magnetic particles 120 have been described above with reference to FIGS. 1A and 1B, and thus, detailed descriptions thereof will be omitted.

The coil unit 200 is buried in the body 100 to display characteristics of a coil component. For example, when the coil component of the present example embodiment is used as a power inductor, the coil unit 200 may serve to stabilize power of an electronic device by storing an electric field as a magnetic field and maintaining an output voltage.

The coil unit 200 may include a support substrate 210 and a coil 220 disposed on at least one surface of the support substrate. For example, the coil 220 may be a coil pattern formed on one surface or both surfaces of the support substrate 210 through a plating process, and thus-formed coil pattern is formed by electroless plating and may include an electroplating layer acting as a seed layer and a plating layer formed on the seed layer by electrolytic plating. However, a shape of the coil unit 200 is not limited thereto, and the coil unit 200 may be formed using a known method without limitation.

The external electrode 300 may be disposed on at least one surface of the body 100 to be connected to the coil unit 200. The external electrode 300 may be formed by a known method such as a plating method, a paste printing method, or the like. The external electrode 300 may be formed of a conductive material, such as copper (Cu), aluminum (Al), silver (Ag), tin (Sn), gold (Au), nickel (Ni), lead (Pb), chromium (Cr), titanium (Ti), or alloys thereof, but is not limited thereto. The external electrode 300 may include a plurality of layers; for example, a first layer including Cu, a second layer disposed on the first layer and including Ni, and a third layer disposed on the second layer and including Sn.

Meanwhile, interfacial degradation between the resin 110 and the magnetic particles 120 may occur in the body 100 of the coil component, and the adhesion between the resin 110 and the magnetic particles 120 may affect the stress of the body 100. Besides, reliability such as lead heat resistance and adhesion strength of the body 100 may be affected. Such interface degradation between the resin 110 and the magnetic particles 120 occurs more frequently, particularly under high temperature conditions in which the adhesion between the resin 110 and the magnetic particles 120 decreases.

In the case of the coil component according to the present disclosure, the magnetic particles 120 include the surface treatment layer 123 so as to provide a coil component having improved adhesion between the magnetic particles 120 and the resin 110. This results in providing a coil component having improved stress, as well as a coil component having improved reliability such as lead heat resistance and adhesion strength.

Figure 2B:
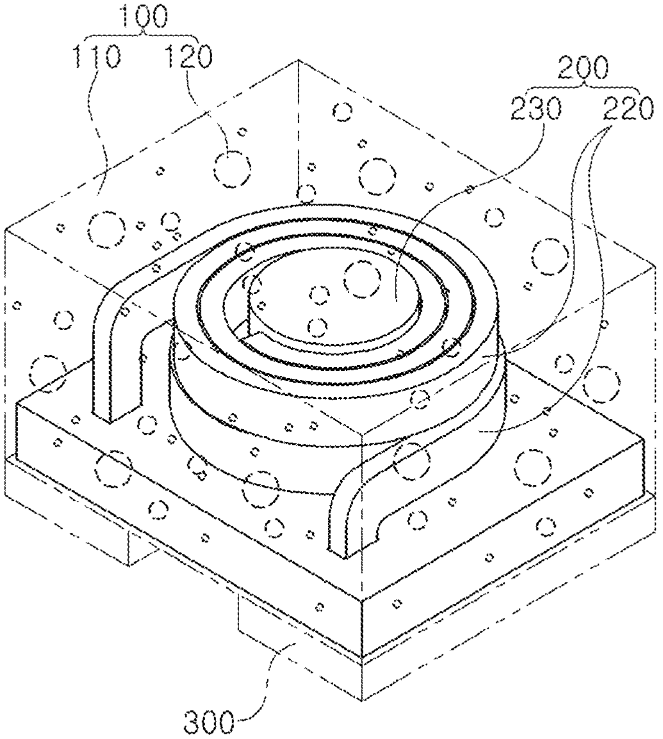
FIG. 2B is a perspective diagram schematically illustrating a coil component according to another example embodiment

FIG. 2B is a perspective diagram schematically illustrating a coil component according to another example embodiment.

Referring to FIGS. 2A and 2B, in the coil component according to another embodiment of the present disclosure, a shape of the coil unit 200 is different from that of the coil component according to an example embodiment of the present invention.

Specifically, a coil unit 200 includes a mold 230 and a coil 220. The coil 220 may be a winding coil formed by winding the mold 230, and thus, the mold 230 includes a region in which the winding coil is wound. For example, the mold 230 may include a cylindrical region, and the coil 220 may be wound along an outer circumference of the cylindrical region.

A description of other coil components may be substantially the same as those described above in the coil component according to an example embodiment of the present invention, and detailed descriptions thereof will be omitted.

Hereinafter, the surface treatment layer 123, among the configuration of the present embodiment, will be described in more detail with reference to the example embodiments.

Figure 3:
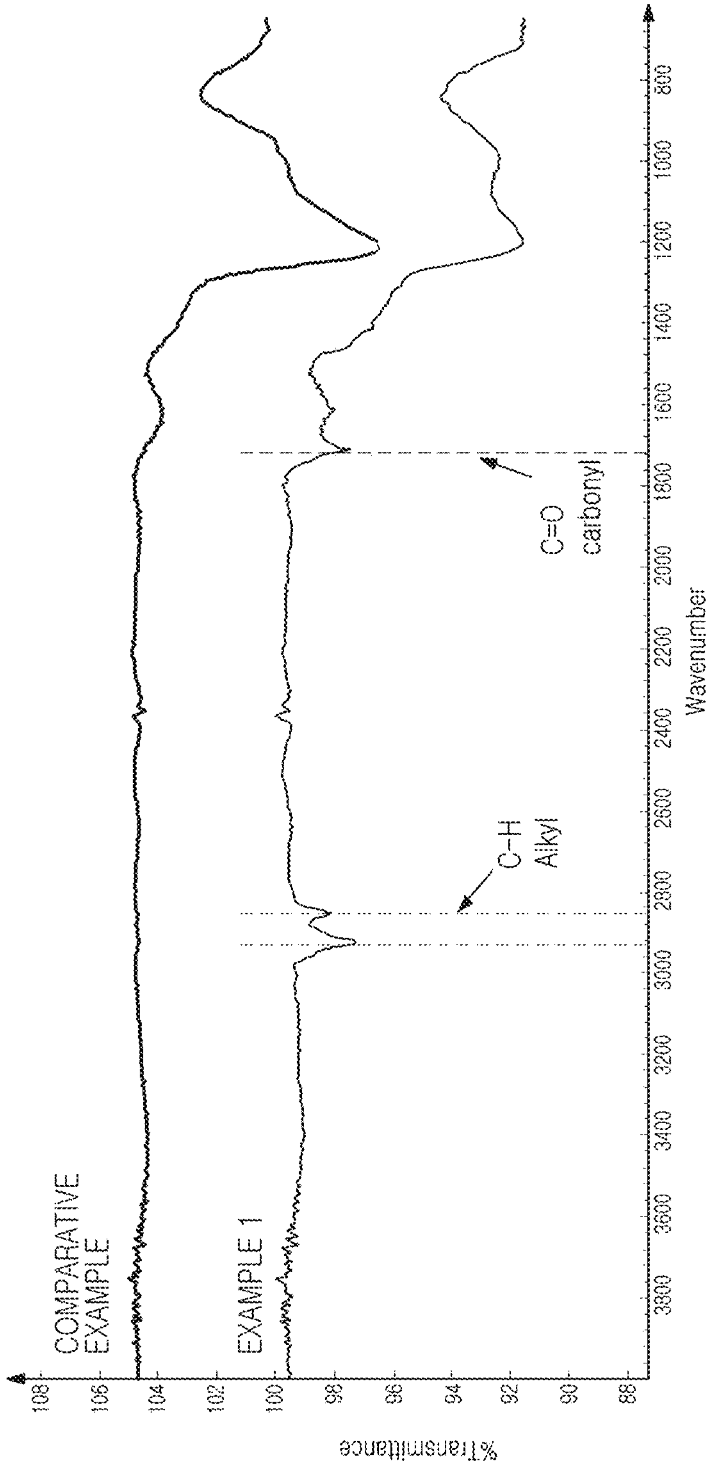
FIG. 3 is a Fourier-transform infrared (FT-IR) spectroscopy diagram illustrating an analysis of components of a surface-treatment layer according to Example 1.

FIG. 3 is a diagram illustrating an analysis of components of a surface-treatment layer according to Example 1.

Figure 4:
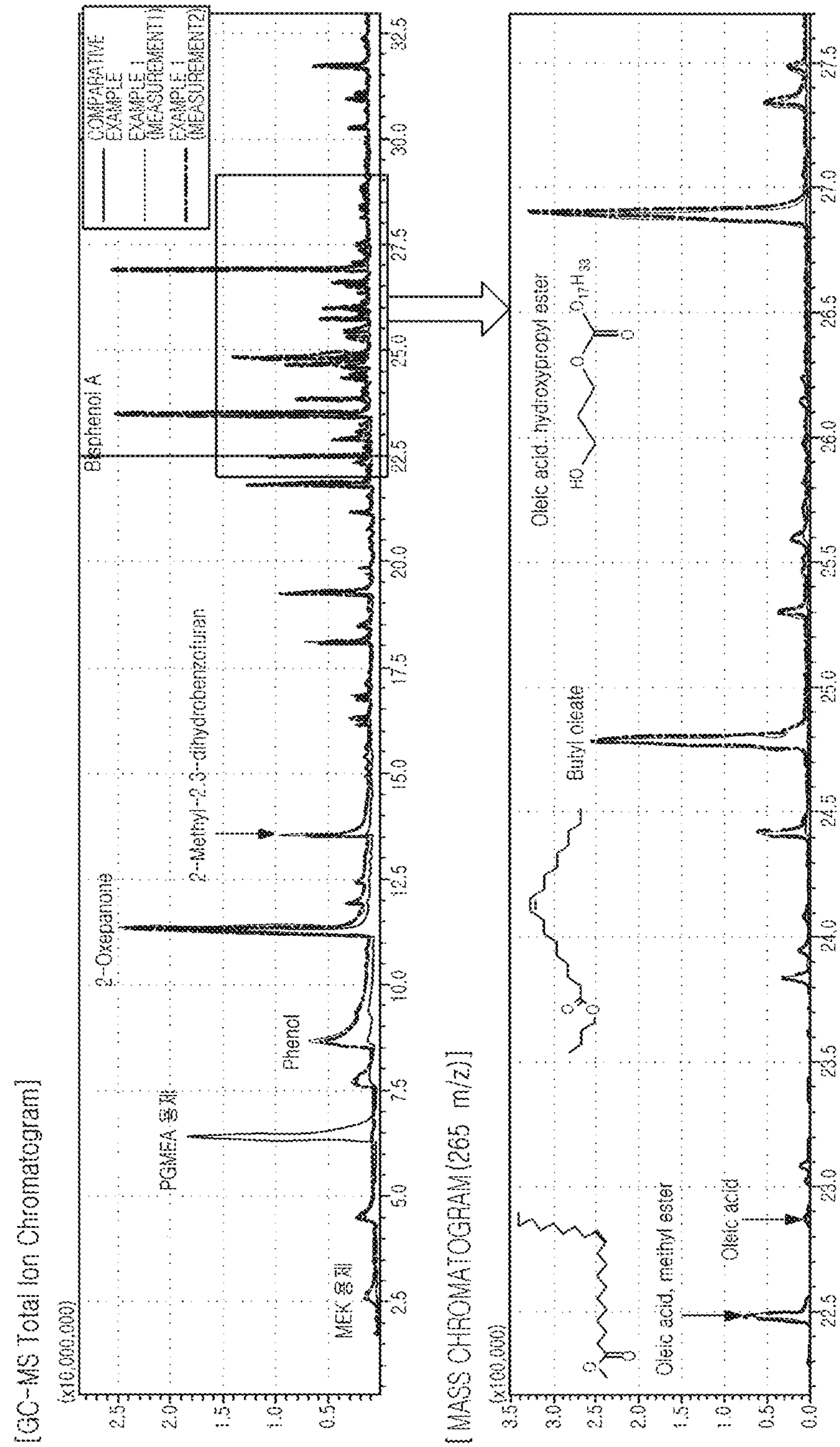
FIG. 4 is a gas chromatography-mass spectrometry (GC-MS) diagram illustrating an analysis of components of a magnetic sheet according to Example 1.

FIG. 4 is a diagram illustrating an analysis of components of a magnetic sheet according to Example 1.

Figure 5:
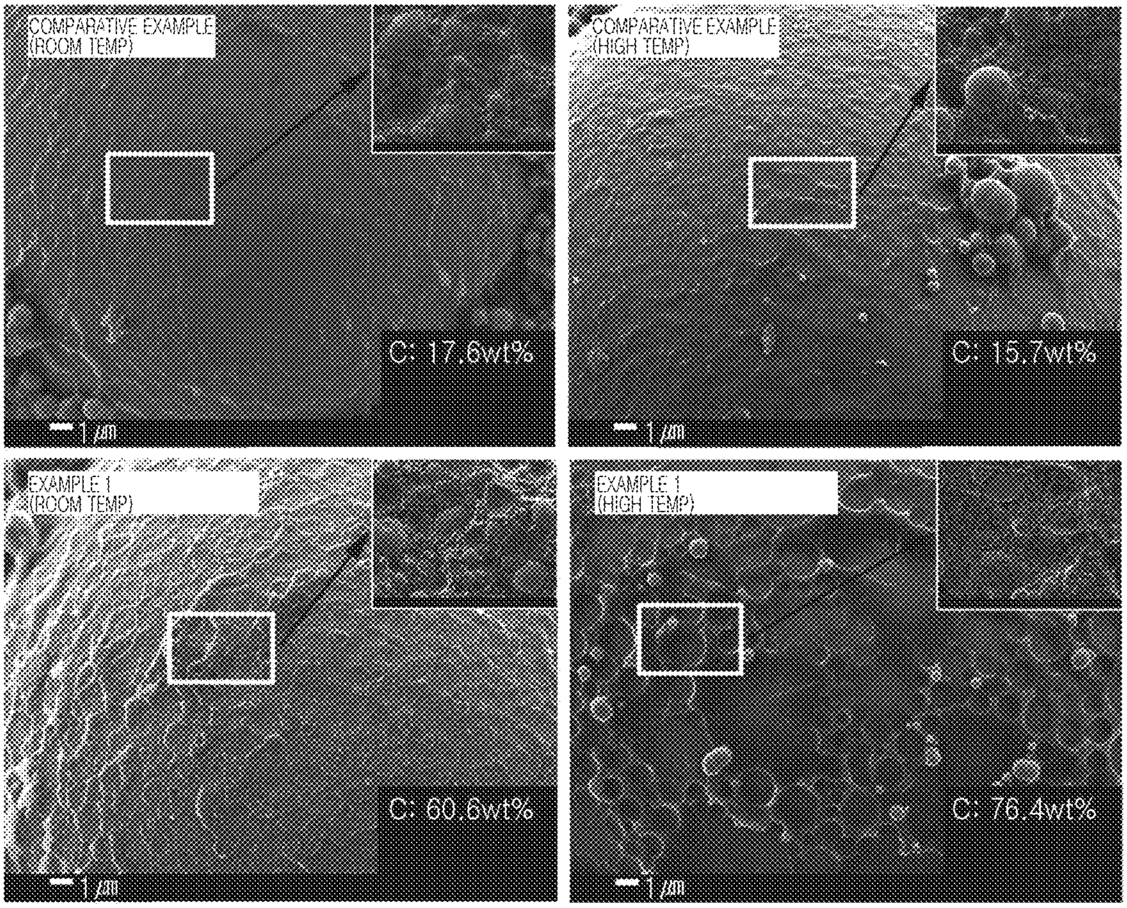
FIG. 5 is an Energy Dispersive X-ray Spectroscopy (EDS) diagram illustrating an analysis of a carbon content of the surface-treatment layer according to Example 1.

FIG. 5 is a diagram illustrating an analysis of a carbon content of the surface-treatment layer according to Example 1.

Figure 6:
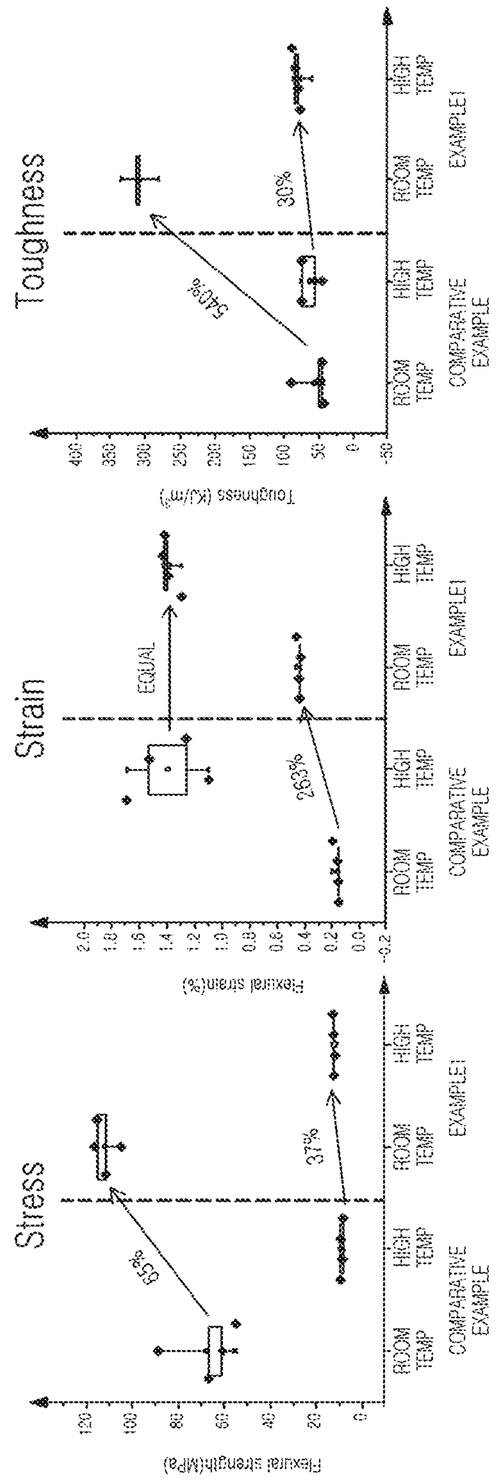
FIG. 6 is a diagram illustrating an analysis of stress, strain and toughness of the magnetic sheet according to Example 1.

FIG. 6 is a diagram illustrating an analysis of stress, strain and toughness of the magnetic sheet according to Example 1.

Figure 7:
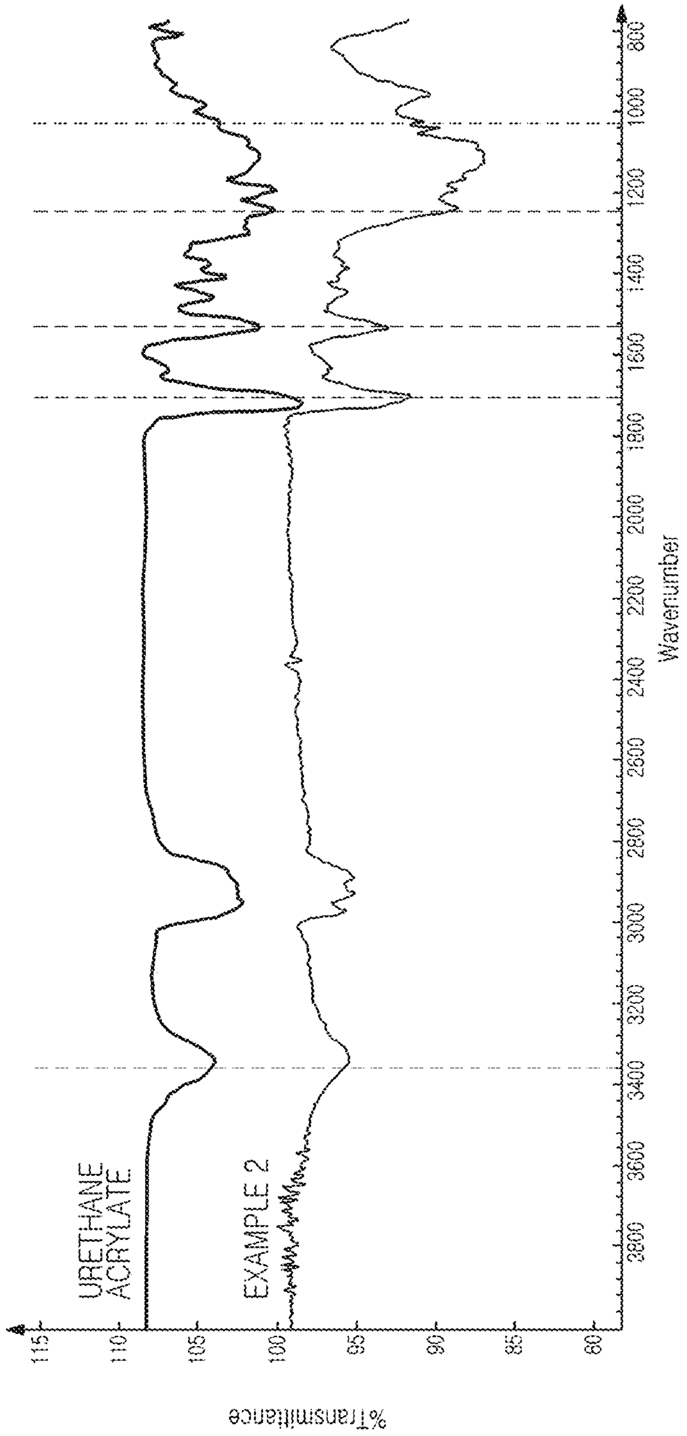
FIG. 7 is a Fourier-transform infrared (FT-IR) spectroscopy diagram illustrating an analysis of components of a surface-treatment layer according to Example 2.

FIG. 7 is a diagram illustrating an analysis of components of a surface-treatment layer according to Example 2.

Figure 8:
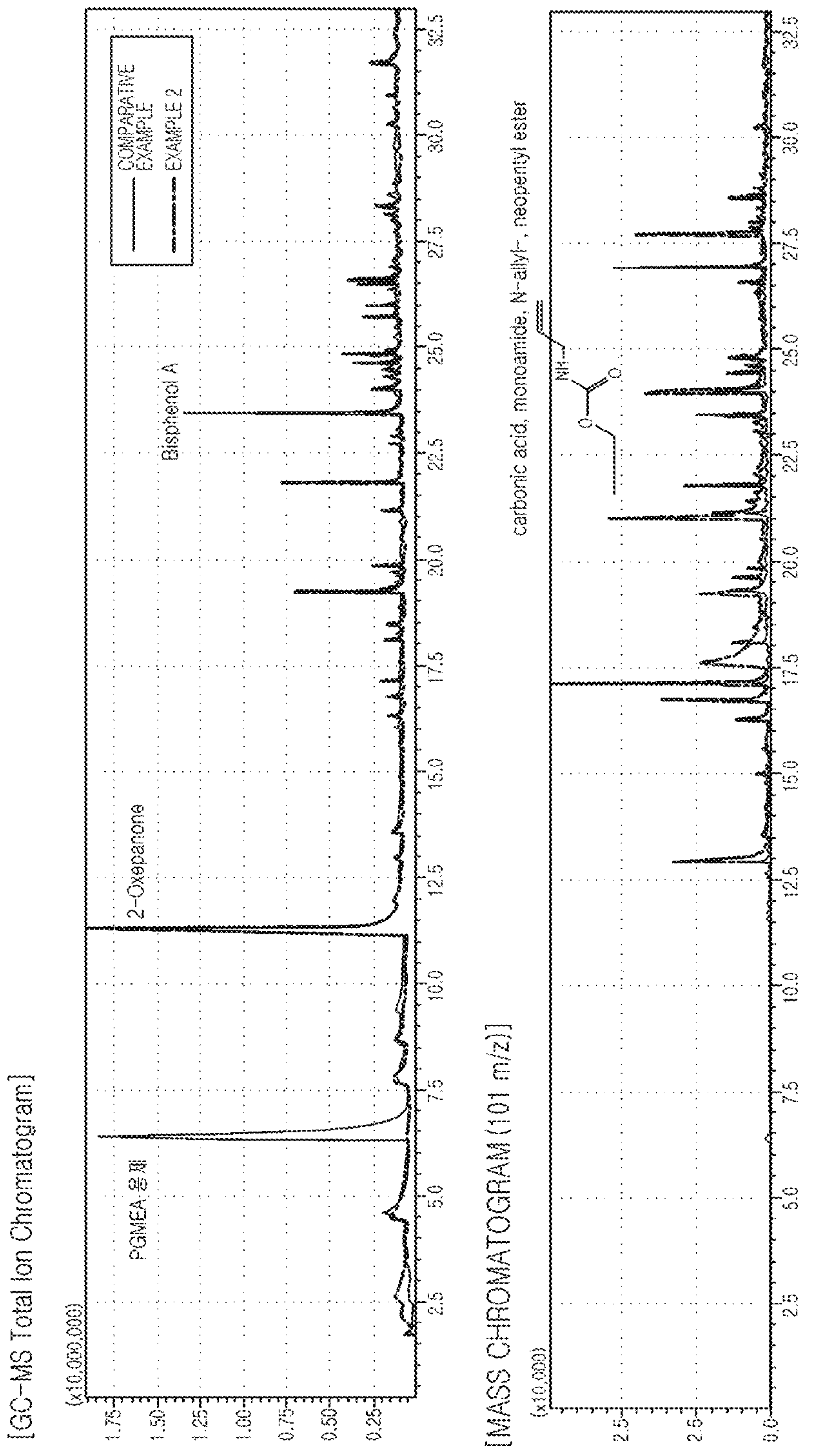
FIG. 8 is a gas chromatography-mass spectrometry (GC-MS) diagram illustrating an analysis of components of a magnetic sheet according to Example 2.

FIG. 8 is a diagram illustrating an analysis of components of a magnetic sheet according to Example 2.

Figure 9:
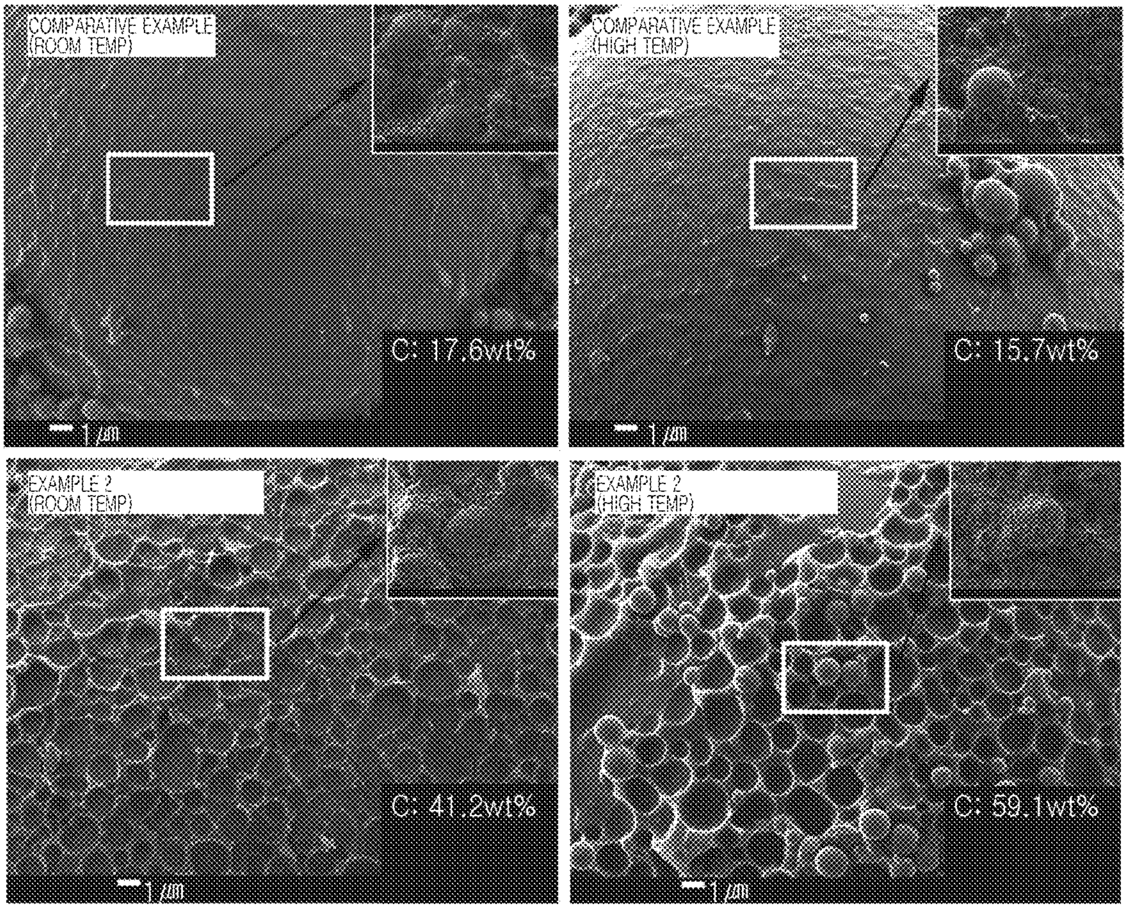
FIG. 9 is an Energy Dispersive X-ray Spectroscopy (EDS) diagram illustrating an analysis of a carbon content of the surface-treatment layer according to Example 2.

FIG. 9 is a diagram illustrating an analysis of a carbon content of the surface-treatment layer according to Example 2.

Figure 10:
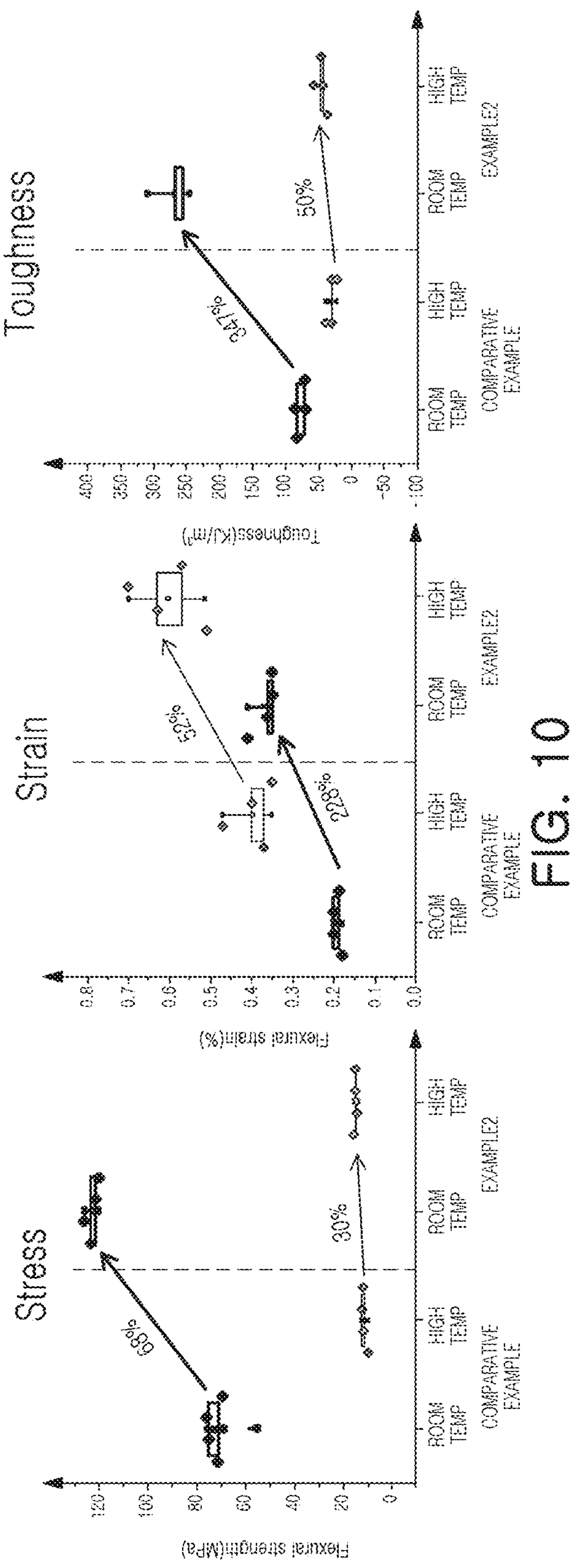
FIG. 10 is a diagram illustrating an analysis of stress, strain and toughness of the magnetic sheet according to Example 2.

FIG. 10 is a diagram illustrating an analysis of stress, strain and toughness of the magnetic sheet according to Example 2.

COMPARATIVE EXAMPLE

In Comparative Example, an insulating layer 122 of a metal oxide film containing aluminum, phosphorus, zinc, silicon and boron was formed on a surface of the magnetic powder particle 121 which is an Fe powder particle, where the insulating layer 122 was not surface-treated. That is, the magnetic particles of Comparative Example did not include the surface-treatment layer 123. Thus-formed magnetic particles were dispersed in an epoxy resin 110 and then cured to form a magnetic sheet.

Example 1

In the case of Example 1, an insulating layer 122 of a metal oxide film containing aluminum, phosphorus, zinc, silicon, and boron was formed on the surface of the magnetic powder particle 121 which was an Fe powder particle, and the surface of the insulating layer 122 was treated with oleic acid to form the surface treatment layer 123. Thus-formed magnetic particles 120 were dispersed in an epoxy resin 110 and then cured to form a magnetic sheet.

Referring to FIG. 3, it can be seen that an alkyl group and a carbonyl group, which are binding components derived from oleic acid, were detected on the surface-treatment layer 123 of Example 1, as described above. Functional groups included in the surface-treatment layer 123 were detected using Fourier-transform infrared (FT-IR) spectroscopy.

Referring to FIG. 4, it can be seen that oleic acid and oleic acid derivatives such as oleic acid methyl ester, butyl oleic acid, and oleic acid 3-hydropropyl ester, which are components derived from oleic acid, were detected in the magnetic sheet of Example 1, as described above. Components included in the body 100 may be detected by gas chromatography-mass spectrometry (GC-MS). Meanwhile, the component of the magnetic sheet was analyzed in Example 1. It would be apparent to those skilled in the art that the same components may be detected in the body 100 formed by stacking a plurality of magnetic sheets.

Referring to FIG. 5, it can be seen that a high content of carbon (C) was detected on the surface-treatment layer 123 of Example 1. Specifically, the C contents of the surface-treatment layer 123 were 17.6 wt % in the case of Comparative Example and 60.6 wt % in the case of Example 1 at room temperature near 25° C., indicating that the C content was higher in Example 1 than in the Comparative Example. Even at a high temperature around 260° C., the C contents of the surface-treatment layer 123 were 15.7 wt % in Comparative Example and 76.4 wt % in Example 1, indicating that the C content was higher in Example 1 than in Comparative Example. In this case, the C content was measured by Energy Dispersive X-ray Spectroscopy (EDS). The C component is determined to be a component derived from the epoxy resin in which the magnetic particles are dispersed, which indicates that an amount of the resin remaining on the surface of the surface-treatment layer 123 is increased. That is, it can be seen that the bonding strength between the magnetic particles and the resin is improved.

Referring to FIG. 6, it can be seen that in Example 1, the stress, the strain and the toughness of the magnetic sheet at room temperature near 25° C. increased by 65%, 263% and 540%, respectively, as compared to Comparative Example. In addition, it can be seen that in Example 1, the stress, the strain and the toughness of the magnetic sheet were increased by 37%, 0%, and 30%, respectively, compared to Comparative Example even at a high temperature near 260° C. That is, it can be seen that Example 1 is superior to Comparative Example in terms of stress, strain and toughness at both room temperature and a high temperature. Meanwhile, stress of the magnetic sheet was evaluated in Example 1. It would be apparent to those skilled in the art that similar results may be derived in the body 100 formed by stacking a plurality of magnetic sheets.

Example 2

In the case of Example 2, an insulating layer 122 of a metal oxide film containing aluminum, phosphorus, zinc, silicon and boron was formed on a surface of magnetic powder particle 121 which is Fe powder particle, and the surface of the insulating layer 122 was treated with an urethane-based silane coupling agent. Thus-formed magnetic particles 120 were dispersed in an epoxy resin 110 and then cured to form a magnetic sheet.

Referring to FIG. 7, as described above, it can be seen that urethane acrylate, which is a bonding component derived from a urethane-based silane coupling agent included in the surface-treatment layer, was detected on the surface-treatment layer 123 of Example 2 as described above. Functional groups included in the surface-treatment layer 123 were detected using Fourier-transform infrared (FT-IR) spectroscopy.

Referring to FIG. 8, as previously described, it can be seen that carbonic acid monoamide N-allyl neopentyl ester, which is a component derived from the urethane-based silane coupling agent included in the surface-treatment layer, was detected in the magnetic sheet of Example 2. Components included in the body 100 may be detected by gas chromatography-mass spectrometry (GC-MS). Meanwhile, components of the magnetic sheet were analyzed in Example 2. It would be apparent to those skilled in the art that the same components may be detected in the body 100 formed by stacking a plurality of magnetic sheets.

Referring to FIG. 9, it can be seen that a high carbon (C) content is detected on the surface-treatment layer 123 of Example 2. Specifically, the C contents of the surface-treatment layer 123 were 17.6 wt % in the case of Comparative Example and 41.2 wt % in the case of Example 2 at room temperature near 25° C., indicating that the C content was comparatively higher in Example 2 than in Comparative Example. Even at a high temperature around 260° C., the C contents of the surface-treatment layer 123 were 15.7 wt % in the case of Comparative Example and 59.1 wt % in the case of Example 1, indicating that the C content was higher in Example than in Comparative Example. In this case, the C content was measured by Energy Dispersive X-ray Spectroscopy (EDS). The C component is determined to be a component derived from the epoxy resin in which the magnetic particles are dispersed, which indicates that an amount of the resin remaining on the surface of the surface-treatment layer 123 is increased. That is, it can be seen that the bonding strength between the magnetic particles and the resin is improved.

Referring to FIG. 10, it can be seen that in Example 2, the stress, the strain and the toughness of the magnetic sheet at room temperature near 25° C. increased by 68%, 228% and 347%, respectively, as compared to Comparative Example. In addition, it can be seen that in Example 2, the stress, the strain and the toughness of the magnetic sheet were increased by 30%, 52%, and 50%, respectively, compared to Comparative Example even at a high temperature near 260° C. That is, it can be seen that Example 2 is superior to Comparative Example in terms of stress, strain and toughness at both room temperature and a high temperature. Meanwhile, stress of the magnetic sheet was evaluated in Example 2. It would be apparent to those skilled in the art that similar results may be derived in the body 100 formed by stacking a plurality of magnetic sheets.

As set forth above, according to the present disclosure, a magnetic sheet having improved adhesion between a magnetic particle and a resin, and a coil component using the same can be provided.

According to the present disclosure, a magnetic sheet having improved stress and a coil component using the same can be provided.

According to the present disclosure, a magnetic sheet having improved reliability, such as lead heat resistance, adhesion strength, or the like, and a coil component using the same can be provided.

Throughout the specification, it will be understood that when an element or layer is referred to as being "connected to" or "coupled to" another element or layer, it can be understood as being "directly connected" or "directly coupled" to the other element or layer or intervening elements or layers may be present. It will be further understood that the terms "comprises," "comprising," "includes," and/or "including" specify the presence of elements, but do not preclude the presence or addition of one or more other elements.

The term "example" does not mean the same example embodiment, but is provided to emphasize and describe different unique features. However, the above suggested examples may be implemented to be combined with a feature of another example. For example, even though particulars described in a specific example are not described in another example, it may be understood as a description related to another example unless described otherwise.

In addition, the terms "first", "second", and the like, are used to distinguish one component from another component, and do not limit a sequence, importance, and the like, of the corresponding components. In some cases, a first component may be named a second component and a second component may also be similarly named a first component, without departing from the scope of the present disclosure.

In the present disclosure, terms used in the present disclosure are used only to describe an example rather than limiting the scope of the present disclosure. Here, singular forms include plural forms unless interpreted otherwise in a context.

While example embodiments have been shown and described above, it will be apparent to those skilled in the art that modifications and variations could be made without departing from the scope of the present invention as defined by the appended claims.

What is claimed is:

1. A magnetic sheet, comprising:

a resin; and a plurality of magnetic particles dispersed in the resin, comprising a plurality of first magnetic particles and a plurality of second magnetic particles having an average particle size smaller than an average particle size of the first magnetic particle, wherein each of the first and second magnetic particles comprises a magnetic powder particle as a core, an insulating layer disposed on a surface of the magnetic powder particle, and a surface-treatment layer disposed on a surface of the insulating layer, the resin fills spaces between the first and second magnetic particles so that the resin is disposed on the surface-treatment layers of the first and second magnetic particles, and the surface-treatment layer comprises oleic acid.

2. The magnetic sheet of claim 1, wherein the magnetic particle further comprises a third magnetic particle having an average particle size smaller than the average particle size of the second magnetic particle.

3. The magnetic sheet of claim 2, wherein the average particle size of the third magnetic particles is 150 nm to 200 nm based on D50 and 1 μm or less based on D90.

4. The magnetic sheet of claim 1, wherein the average particle size of the first magnetic particles is 30 μm based on D50 and 60 μm to 70 μm based on D90.

5. The magnetic sheet of claim 1, wherein the average particle size of the second magnetic particles is 2 μm based on D50 and 8 μm to 9 μm based on D90.

6. The magnetic sheet of claim 1, wherein the surface-treatment layer is directly disposed on an entire surface of the insulating layer.

7. A coil component, comprising:

a body comprising a resin and a plurality of first magnetic particles and a plurality of second magnetic particles having an average particle size smaller than an average particle size of the first magnetic particle, wherein the plurality of first and second magnetic particles are disposed in the resin;

a coil unit disposed inside the body; and an external electrode disposed in the body and connected to the coil unit, wherein each of the plurality of first and second magnetic particles comprises a magnetic powder particle as a core, an insulating layer disposed on a surface of the magnetic powder particle and a surface-treatment layer disposed on a surface of the insulating layer, the resin fills spaces between the plurality of first and second magnetic particles so that the resin is disposed on the surface-treatment layers of the plurality of first and second magnetic particles, and the surface-treatment layer comprises oleic acid.

8. The coil component of claim 7, wherein the body further comprises a third magnetic particle having an average particle size smaller than the average particle size of the second magnetic particle.

9. A magnetic sheet, comprising:

a resin; and a plurality of magnetic particles dispersed in the resin, wherein each of the plurality of magnetic particles comprises a magnetic powder particle as a core, an insulating layer disposed on a surface of the magnetic powder particle, and a surface-treatment layer disposed on a surface of the insulating layer, the surface-treatment layer comprises a urethan acrylate, and the resin fills spaces between the plurality of magnetic particles so that the resin is disposed on the surface-treatment layer.

10. The magnetic sheet of claim 9, wherein the magnetic sheet comprises carbonic acid monoamide N-allyl neopentyl ester.

11. The magnetic sheet of claim 9, wherein the plurality of magnetic particles comprise a first magnetic particle and a second magnetic particle having an average particle size smaller than an average particle size of the first magnetic particle.

12. The magnetic sheet of claim 9, wherein the plurality of magnetic particles further comprise a third magnetic particle having an average particle size smaller than the average particle size of the second magnetic particle.

* * * * *